US 6,565,935 B1

(12) United States Patent
Lohnes

(10) Patent No.: US 6,565,935 B1
(45) Date of Patent: May 20, 2003

(54) POLYMER CONCRETE STRUCTURES

(75) Inventor: Steve Lohnes, Georgetown (CA)

(73) Assignee: Cappar Limited, Brampton (CA)

( * ) Notice: Subject to any disclaimer, the term of this patent is extended or adjusted under 35 U.S.C. 154(b) by 0 days.

(21) Appl. No.: 09/291,495

(22) Filed: Apr. 14, 1999

(51) Int. Cl.⁷ .............................. B29D 22/00; B65D 1/08
(52) U.S. Cl. .................... 428/35.7; 428/34.1; 428/34.4; 428/35.8; 428/413; 428/426; 428/402; 428/404; 523/200; 523/543; 524/261; 524/315; 524/400; 528/93
(58) Field of Search ............................... 428/34.1, 34.4, 428/35.7, 35.8, 413, 426, 402, 404; 523/543, 200; 524/400, 261, 315; 528/93

(56) References Cited

U.S. PATENT DOCUMENTS

| | | | |
|---|---|---|---|
| 3,836,600 A | * | 9/1974 | Brewbaker et al. .......... 260/836 |
| 4,608,280 A | | 8/1986 | Robinson .................... 427/230 |
| 5,498,683 A | * | 3/1996 | Kim ........................... 526/320 |
| 6,048,593 A | * | 4/2000 | Espeland et al. .......... 428/34.1 |

FOREIGN PATENT DOCUMENTS

| | | |
|---|---|---|
| CA | 572367 | 3/1959 |
| CA | 1338297 | 2/1989 |
| CA | 1328285 | 1/1992 |
| CA | 2061801 | 2/1992 |

OTHER PUBLICATIONS

C.E. Zarnitz, Metal Finishing, vol. 97, Issue 1, pp. 667–668.*

* cited by examiner

Primary Examiner—Harold Pyon
Assistant Examiner—Marc Patterson
(74) Attorney, Agent, or Firm—Caesar, Rivise, Bernstein, Cohen & Pokotilow, Ltd.

(57) ABSTRACT

A structure comprising a filled thermosetting polymer composition. The filled thermosetting polymer composition has a mineral filler content of at least 92% by weight and not more than 8% by weight of thermosetting polymer and a co-efficient of thermal expansion that is less than $15 \times 10^{-6}$ in/in/° C. The filler is a mineral particulate filler with generally rounded edges and the thermosetting polymer composition has a density that is at least 95% of the theoretical density for the filler and polymer. Embodiments of the composition per se may be used to form a structure for resisting acid solutions.

21 Claims, No Drawings

POLYMER CONCRETE STRUCTURES

FIELD OF THE INVENTION

The present invention relates to polymer concrete structures in the form of vessels, cells or other containers or components of a type that may be used, for example, for containing or use with acid solutions, especially heated acid solutions e.g. electrochemical cells.

Polymer concrete refers to compositions that are formed from thermosetting polymers and aggregates, especially in which the aggregate is particulate siliceous fillers e.g. sand, gravel, quartz stones and the like.

BACKGROUND OF THE INVENTION

Polymer concrete is particularly intended for use in the forming of a variety of structures that are exposed to corrosive environments and/or which are subject to abrasive environments. The corrosive environments may be atmospheric conditions in which the structure would be exposed to acids that exist in the atmospheric environment. In other embodiments, the polymer concrete is intended for use in the formation of vessels that are intended to contain corrosive chemicals, for instance acids.

One end-use for polymer concrete compositions is in the field of electrolytic recovery of metals from corrosive metal-bearing acid solutions. Techniques for the recovery of metals from ores or concentrates frequently involve the use of electrolysis, often using warm or hot acidic solutions. The warm or hot acidic solutions are contained in vessels, known as cells, that have a plurality of rows of electrodes, which are alternately anodes and cathodes. Electrolytic deposition of the metal is effected from the electrolyte onto the cathode. The electrolyte is almost invariably an acid solution of a type which can be highly corrosive to materials from which the container or cell is formed.

Cells were traditionally produced from concrete, with a chemically-resistant non-bonded liner incorporated inside the tank. However, such liners did not provide long term protection for the concrete. Damage to the liner e.g. cracks and holes, resulted in penetration of hot acid through the liner to the concrete, and the likelihood of catastrophic deterioration of the concrete cell. Maintenance costs were very high.

Concrete cells with liners have been replaced with cells formed from polymer concrete compositions of vinyl ester polymers and aggregate blends, the latter normally being siliceous material in a particulate form e.g. sand or gravel. These polymer concrete compositions typically have 10–12% by weight of polymer. While cells formed from vinyl ester resins/aggregate blends are a significant improvement over lined concrete cells, it was found that cracks occur in the manufacture of the cell i.e. in the so-called pre-cast product, necessitating repair and complete coating of both interior and exterior surfaces with a high build/high polymer content layer before the cell can be released for use in an electrochemical process.

The tendency for cells made from vinyl ester resin/aggregate blends to crack during casting results in the need to provide internal coatings for such tanks, and/or to effect repairs on site after installation but before use of the cell. The need to provide coatings and repairs is both time consuming to the manufacturer of the cell and to the user of the cell, and an added expense in the manufacture and supply of such cells. While these cells represent a significant improvement over previous cells, the need to conduct repairs prior to use partially defeats the intent and gains to be obtained from use of polymer concrete compositions.

In addition to the use of polymer concrete compositions in electrochemical cells, there are other structures that require protection against acidic environments or abrasive conditions, in which traditional concrete is susceptible to the environment and where additional protective layers are required or could be beneficial. Such other structures could include beams, channels, curbs, drains, chutes, pipes, floors and structures that require chemical and abrasive protection, compared to traditional concrete.

Polymer concrete compositions that are intended to be used in environments that are exposed to corrosive chemical attack are known. For instance, U.S. Pat. No. 4,621,010 and related EP 0 170 740 are directed to composite materials suitable for use in making containers or structures exposed to corrosive chemical attack, which are formed by mixing a synthetic resin material with two different hardeners and employing a filler of particulate siliceous material e.g. sand, gravel, quartz stones or the like. A skin coat formed from the same resin but using a filler with a fine particle size of less than 0.5 mm may be added, which permits use of larger particles, such as 6 mm and above, in the formation of the cell. Typical sizes of the filler were stated to be about 40% by weight of total filler in the range 0.5–1 mm, with other fractions including about 15% by weight in the range 1–1.75 mm and a further 15% by weight in the range 1.75–3 mm. It was found that larger particles, up to 6 mm, imparted strength to the structures that had been formed.

SUMMARY OF THE INVENTION

A polymer concrete structure has now been found that is resistant to acid solutions.

An aspect of the present invention provides a structure for resisting acid solutions, said structure being formed from a filled thermosetting polymer composition comprising a mineral filler in an amount of at least 92% by weight and not more than 8% by weight of thermosetting polymer, said composition containing a wetting agent, said composition having a co-efficient of thermal expansion that is less than $15 \times 10^{-6}$ in/in/° F., the filler being a mineral particulate filler with generally rounded edges and the thermosetting polymer composition having a density that is at least 95% of the theoretical density for said filler and polymer, the filler being comprised of at least 50% by weight of a particle size that is greater than 6 mm, at least 70% by weight of a particle size that is greater than 2.4 mm, and at least 85% by weight of a particle size that is greater than 0.4 mm, the thermosetting polymer being obtained by reaction of (a) an epoxy resin formed from at least one of Bisphenol A and Bisphenol F with (b) an amine selected from at least one of an aliphatic and a cyclo-aliphatic amine.

A further aspect of the present invention provides a vessel for resisting acid solutions, said vessel being formed from a filled thermosetting polymer composition comprising a mineral filler in an amount of at least 92% by weight and not more than 8% by weight of thermosetting polymer, said composition containing a wetting agent, said composition having a co-efficient of thermal expansion that is less than $15 \times 10^{-6}$ in/in/° F., the filler being a mineral particulate filler with generally rounded edges and the thermosetting polymer composition having a density that is at least 95% of the theoretical density for said filler and polymer, the filler being comprised of at least 50% by weight of a particle size that is greater than 6 mm, at least 70% by weight of a particle size that is greater than 2.4 mm, and at least 85% by weight of a particle size that is greater than 0.4 mm, the thermosetting polymer being obtained by reaction of (a) an epoxy resin formed from at least one of Bisphenol A and Bisphenol F with (b) an amine selected from at least one of an aliphatic and a cyclo-aliphatic amine.

DETAILED DESCRIPTION OF THE INVENTION

The present invention utilizes a polymer concrete composition which is a filled thermosetting polymer composition having a mineral filler content of at least 92% weight. Conversely, the composition contains not more than 8% by weight of the thermosetting polymer. In preferred embodiments of the invention, the polymer concrete composition contains 92–94% by weight of the mineral filler, and correspondingly 6–8% by weight of the polymer.

The thermosetting polymer may be varied depending on the particular conditions of use of the resultant structure e.g. the chemical or abrasive environment that the structure would encounter during normal use. Preferred examples of the thermosetting polymer are formed from epoxy resins that are based on at least one of Bisphenol-A and Bisphenol-F and at least one of an aliphatic and a cycloaliphatic amine. Examples of such amines are known. Epoxy resins based on Bisphenol-A are typically a reaction product of bisphenol-A and epichlorohydrin, which gives the diglycidyl ether of bisphenol-A. The equivalent weight is preferably 182–192, and such a resin has a viscosity at 25° C. of 11000–14000 mPa·s. Epoxy resins based on Bisphenol-F are typically a reaction product of bisphenol-F and epichlorohydrin. The equivalent weight is preferably about 160, and such a resin has a viscosity at 25° C. of about 3500 mpa·s. Examples of aliphatic amines are triethylene tetramine and diethylene triamine. Examples of cycloaliphatic amines are isophorone diamine and diaminocyclohexane.

The filled thermosetting polymer composition of the invention is characterized by having a co-efficient of thermal expansion that is less than $15 \times 10^{-6}$ in/in/° F. In preferred embodiments of the invention, the co-efficient of thermal expansion is less than $12 \times 10^{-6}$ in/in/° F.

The filler that is used in the filled thermosetting polymer compositions is preferably a mineral particulate filler that has generally rounded edges. In particular, the filler should not be characterized by sharp angular edges, as such a profile provides a greater surface area for polymer "wetting" and greater void formation and such profiles are generally lower in impact/compression load resistance. As illustrated herein, filler with sharp angular edges also has detrimental effects on the flow of the compositions, compared to filler with round edges. While the filler may have a variety of shapes, of a random nature, such shapes should be characterized by generally rounded edges. In particular, the particulate has edges that are smooth. The filler is further particularly characterized by being comprised of at least 50% by weight of a particle size that is greater than 6 mm, at least 70% by weight of a particle size that is greater than 2.4 mm and at least 85% by weight of a particle size that is greater than 0.4 mm.

The composite structure formed from the thermosetting polymer composition should have a density that is at least 95% of the theoretical density for that particular combination of filler and polymer. The theoretical density may be calculated on the basis of cured polymer that does not contain filler and the amount of filler, calculated in terms of volume and weight. The requirement that the composition have a density that is at least 95% of the theoretical density, and more particularly at least 97.5% of the theoretically density, is an indication of the degree of voids within the composite structure. The presence of voids is an indication of potential defects within the composite structure, and thus the level of voids should be minimized. In embodiments in which the polymer concrete composition is to be bonded to a layer of concrete, such a density is comparable to that of concrete, and represents minimal air entrapment and high impermeability.

The composite structure may be either pigmented, or more preferably clear to permit visual observation and for confirmation of a consistent distribution of aggregate within the polymer.

In addition, the compositions of the present invention exhibit a low peak exotherm to minimize contraction on cooling. High exotherm temperatures tend to result from compositions with higher polymer content and subsequent contraction upon cooling can result in formation of cracks and development of stress within the polymer concrete. In particular, the compositions of the present invention exhibit a peak exotherm temperature that is not greater than 25° C. higher than the ambient temperature at which curing occurs. It is further preferred that the curing occur at a temperature in the range of 15–35° C. Such curing must occur in the absence of external cooling or heating, because such cooling or heating tends to create areas of stress within the structure, which may lead to cracks during use or transportation. The low peak exotherm temperature resulting from the present invention effectively eliminates cracking on contraction of the structure on cooling.

The compositions of the present invention contain at least one wetting agent, and preferably a mixture of wetting agents. Examples of such wetting agents include saturated polyesters with acid groups, titanate coupling agents and functional silanes, especially mixtures thereof.

In preferred embodiments of the present invention, the filled thermosetting polymer composition exhibits a slump diameter of greater than 18 cm.

As used herein, slump reflects the ability of the composition to flow freely under the influence of gravity, and is measured by placing a 0.28 liter sample into an open cylinder with a diameter of 7.2 cm on a smooth flat surface and then removing the cylinder to allow the composition to flow freely. The smooth flat surface should be formed from the material of the mould that is to be used, or have similar surface characteristics. The slump is the average diameter of the resultant mass of the composition after curing.

Structures are formed from the filled thermosetting polymer compositions described herein by techniques that are known. In particular, the filled thermosetting composition is poured into a mould of the desired shape, and permitted to cure at ambient temperature for a period of time that depends on the temperature, thickness and other factors but which is usually a period of 1–24 hours.

In the present invention, the filled thermosetting composition is used for the entire cell structure. Electrochemical cells may be formed using the epoxy polymer compositions to obtain cells that do not exhibit cracking on casting and cooling, or require minimal repair for cracks and other defects, particularly compared with existing electrochemical cells formed from filled vinyl ester polymer compositions. The advantage of using the epoxy filled compositions of the invention in the manufacture of electrochemical cells is exemplified below.

In one embodiment of the use of the present invention, an electrochemical cell is formed for use in the electrowinning of metals from acid solution, especially 14–22% w/w sulphuric acid solution at temperatures of 45–70° C. In particular embodiments, the solution contains about 18% w/w sulphuric acid and the temperature is 60–65° C.

The present invention is illustrated by the following examples.

EXAMPLE I

An electrochemical cell for use in electrowinning of metals from hot acid solution was formed from resin filled with aggregate. Each cell was divided internally into two compartments by a central wall. The cells measured approximately 132 cm in height, 297 cm in length and 185 cm in width. All of the outer and central wall thicknesses were approximately 7.6 cm.

A commercial electrochemical cell generally as described above was formed using a thermosetting vinyl ester polymer composition containing 92% by weight of aggregate and 8% by weight of vinyl ester resin, using established procedures. It was found that the cell had large sections of at least 10 cm in length chipped out of walls of the cell at its upper edges and several cracks that extended for the full height of the walls and across at least part of the base (floor) of the cell. Such results were generally typical for electrochemical cells formed from the vinyl ester resins and aggregate.

In order to obtain an electrochemical cell with commercially acceptable properties, it was necessary to coat the cell with a coating of a vinyl ester gel coat in a total thickness of about 2 mm.

An electrochemical cell as described above was formed, in the same mould, using a thermosetting epoxy polymer composition containing 92% by weight of aggregate, 8% by weight of epoxy resin and wetting agent. The epoxy resin was based on bisphenol-A and was as described herein. The aggregate conformed with the particle size distribution described above and the composition was as described herein for the present invention.

It was found that the cell obtained had smooth walls without cracks or chips. The electrochemical cell had commercially acceptable properties without being coated.

Both pigmented and clear compositions were used in fabrication of the cells according to the invention.

EXAMPLE II

A composition (Control) of 92% by weight of aggregate and 8% by weight of an epoxy resin as described herein was prepared. The aggregate was comprised of at least 50% by weight of a particle size greater than 6 mm, at least 70% by weight of a particle size greater than 2.4 mm and at least 85% by weight of a particle size that is greater than 0.4 mm. The aggregate was characterized by generally round smooth edges. In part, the aggregate was Barnes 32 silica which has a round particle size of about 0.42 mm (average). The composition additionally contained a mixture of wetting agents as described herein.

A second composition (Sample A) as prepared in which the amount of wetting agent in the Control was increased to double the amount.

A third composition (Sample B) was prepared in which the wetting agent in the Control was eliminated.

A fourth composition (Sample C) was prepared in which the fine particulate of the aggregate of the Control was eliminated.

A fifth composition (Sample D) was prepared in which the round Barnes 32 silica was replaced with a crushed angular silica, Unimin 25, of equivalent sieve size.

A sixth composition (Sample E) was prepared in which the round Barnes 32 was replaced with Barnes 71 silica, which is a round silica with a particle size of 0.15 mm (average).

A slump test as described herein was performed with each composition, using the cylinder of 7.2 cm diameter. The average diameter of the resultant mass after curing was measured.

The results obtained were as follows:

| Sample | Slump Diameter |
|---|---|
| Control | 19.8 |
| A | 19.8 |
| B | 7.7 |
| C | 16.0 |
| D | 9.6 |
| E | 17.6 |

The result for Sample A was the same as for the Control, indicating that additional wetting agent did not increase the flow of the composition in the slump test. However, when the wetting agent was eliminated (Sample B) the flow in the slump test was reduced substantially indicating that the presence of wetting agent improved flow characteristics.

Elimination of fines (Sample C) also resulted in reduced flow in the slump test.

Replacement of the round silica with sharp-edged silica (Sample D) had a substantial effect on the flow of the composition in the slump test.

Sample E shows that changing a preferred grade of silica as used in the Control to a finer grade of silica will reduce flow of the composition.

This example shows the importance of use of silica with rounded edges and the presence of both a size graded silica and wetting agents. The example also shows that flow properties may be varied detrimentally from an optimum composition by changes in the composition.

What is claimed is:

1. A structure for resisting acid solutions, said structure being formed from a filled thermosetting polymer composition comprising:

a mineral filler in an amount of at least 92% by weight, wherein the mineral filler consists of a mineral particulate filler with generally rounded edges and comprised of at least 50% by weight of a particle size that is greater than 6 mm, at least 70% by weight of a particle size that is greater than 2.4 mm and at least 85% by weight of a particle size that is greater than 0.4 mm;

a thermosetting polymer in an amount not more than 8% by weight, whereby the thermosetting polymer is obtained by reaction of (a) an epoxy resin, wherein the epoxy resin is formed from at least one of Bisphenol A and Bisphenol F, with (b) an amine selected from at least one of an aliphatic amine and a cyclo-aliphatic amine; and a wetting agent, said composition having a co-efficient of thermal expansion that is less than $15 \times 10^{-6}$ in/in/° F. and having a density that is at least 95% of the theoretical density for said mineral filler and the thermosetting polymer.

2. The structure of claim 1 in which the polymer composition is pigmented or clear.

3. The structure of claim 1 in which the filled thermosetting composition, prior to curing, exhibits a slump of greater than 18 cm.

4. The structure of claim 1 in the form of a vessel which may be used as an electrochemical cell without repair after casting and prior to use.

5. The structure of claim 1 in which the vessel is formed with one layer, said layer being said filled thermosetting polymer composition.

6. The structure of claim 5 in which the epoxy resin is a Bisphenol-A resin with an equivalent weight of about 182–192 or a Bisphenol-F resin with an equivalent weight of about 160.

7. The structure of claim 6 in which the amine is selected from the group consisting of triethylene tetramine, diethylene triamine, isophorone diamine and diaminocyclohexane, and mixtures thereof.

8. The structure of claim 5 in which the thermosetting polymer composition has a density that is at least 97.5% of the theoretical density for said filler and polymer.

9. The structure of claim 8 in which the filler has been treated to promote bonding to the polymer composition.

10. The structure of claim 8 in which, during curing, the polymer concrete composition exhibits a peak exotherm temperature that is not greater than 25° C. higher than ambient temperature.

11. The structure of claim 8 in which the composition has a co-efficient of thermal expansion that is less than $15 \times 10^{-6}$ in/in/° F.

12. The structure of claim 8 in which the wetting agent is a mixture of wetting agents.

13. The structure of claim 8 in which the wetting agent is selected from saturated polyesters with acid groups, titanate coupling agents and functional silanes, and mixtures thereof.

14. A vessel for resisting acid solutions, said vessel being formed from a filled thermosetting polymer composition comprising:

a mineral filler in an amount of at least 92% by weight, wherein the mineral filler consists of a mineral particulate filler with generally rounded edges and comprised of at least 50% by weight of a particle size that is greater than 6 mm, at least 70% by weight of a particle size that is greater than 2.4 mm and at least 85% by weight of a particle size that is greater than 0.4 mm;

a thermosetting polymer in an amount not more than 8% by weight, whereby the thermosetting polymer is obtained by reaction of (a) an epoxy resin, wherein the epoxy resin is formed from at least one of Bisphenol A and Bisphenol F, with (b) an amine selected from at least one of an aliphatic amine and a cyclo-aliphatic amine; and a wetting agent, said composition having a co-efficient of thermal expansion that is less than $15 \times 10^{-6}$ in/in/° F. and having a density that is at least 95% of the theoretical density for said mineral filler and the thermosetting polymer.

15. The vessel of claim 14 in which the filled thermosetting composition, prior to curing, exhibits a slump of greater than 18 cm.

16. The vessel of claim 15 in which the thermosetting polymer composition has a density that is at least 97.5% of the theoretical density for said filler and polymer.

17. The vessel of claim 16 in which the wetting agent is selected from saturated polyesters with acid groups, titanate coupling agents and functional silanes, and mixtures thereof.

18. The vessel of claim 16 in which the epoxy resin is a Bisphenol-A resin with an equivalent weight of about 182–192 or a Bisphenol-F resin with an equivalent weight of about 160.

19. The vessel of claim 18 in which the amine is selected from the group consisting of triethylene tetramine, diethylene triamine, isophorone diamine and diaminocyclohexane, and mixtures thereof.

20. A vessel of claim 18 in which the vessel is for use in contact with 14–22% w/w sulphuric acid at 45–70° C.

21. A filled thermosetting polymer composition comprising:

a mineral filler in an amount of at least 92% by weight, wherein the mineral filler consists of a mineral particulate filler with generally rounded edges and comprised of at least 50% by weight of a particle size that is greater than 6 mm, at least 70% by weight of a particle size that is greater than 2.4 mm and at least 85% by weight of a particle size that is greater than 0.4 mm;

a thermosetting polymer in an amount not more than 8% by weight, whereby the thermosetting polymer is obtained by reaction of (a) an epoxy resin, wherein the epoxy resin is formed from at least one of Bisphenol A and Bisphenol F, with (b) an amine selected from at least one of an aliphatic amine and a cyclo-aliphatic amine; and a wetting agent, said composition having a co-efficient of thermal expansion that is less than $15 \times 10^{-6}$ in/in/° F. and having a density that is at least 95% of the theoretical density for said mineral filler and the thermosetting polymer.

* * * * *